United States Patent
Urrego Bernal (10) Patent No.: US 12,285,127 B2
(45) Date of Patent: *Apr. 29, 2025

(54) PLANT TRANSPORTATION SYSTEM

(71) Applicants: C.I. Toyota Tsusho de Colombia S.A., Bogotá (CO); CONSULTING & OUTSOURCING GLOBAL NETWORK S.A.S., Cajica (CO)

(72) Inventor: Julio César Urrego Bernal, Cundinamarca (CO)

(73) Assignee: CONSULTING & OUTSOURCING GLOBAL NETWORK S.A.S., Cajica (CO)

( * ) Notice: Subject to any disclaimer, the term of this patent is extended or adjusted under 35 U.S.C. 154(b) by 0 days.

This patent is subject to a terminal disclaimer.

(21) Appl. No.: 17/229,229

(22) Filed: Apr. 13, 2021

(65) Prior Publication Data

US 2021/0353078 A1     Nov. 18, 2021

Related U.S. Application Data

(63) Continuation-in-part of application No. 16/875,484, filed on May 15, 2020, now Pat. No. 10,986,944.

(51) Int. Cl.
| | | |
|---|---|---|
| *A47G 7/07* | (2006.01) | |
| *A47G 7/03* | (2006.01) | |
| *B65D 85/50* | (2006.01) | |

(52) U.S. Cl.
CPC ............. *A47G 7/07* (2013.01); *A47G 7/03* (2013.01); *B65D 85/505* (2013.01)

(58) Field of Classification Search
CPC .......... A47G 7/07; A47G 7/03; B65D 85/505
See application file for complete search history.

(56) References Cited

U.S. PATENT DOCUMENTS

| 1,775,250 A | 9/1930 | Link |
|---|---|---|
| 1,828,295 A | 10/1931 | Roy |

(Continued)

FOREIGN PATENT DOCUMENTS

| EP | 3058809 A1 | 8/2016 |
|---|---|---|
| FR | 2659828 B1 | 12/1992 |

(Continued)

OTHER PUBLICATIONS

International Search Report and Written Opinion from the International Searching Authority for International Patent Application No. PCT/IB2021/054163 dated Aug. 10, 2021 (in English) (13 Pages).

*Primary Examiner* — Jessica B Wong
(74) *Attorney, Agent, or Firm* — Christopher G. Darrow; Darrow Mustafa PC (57) ABSTRACT

A plant transportation system includes a vase and a sealant receptacle. The vase includes a mouth, a throat, and a reservoir. The sealant receptacle is housed in the throat. The sealant receptacle is configured to allow a defined amount of stems therethrough, and includes a cover extending across the throat, a base extending across the throat behind the cover, and a sidewall extending behind the cover to the base. The cover defines at least one cover-side stem aperture, the base defines at least one base-side stem aperture, and the sidewall closes the sealant receptacle from the side. The at least one cover-side stem aperture is similarly sized to the defined amount of stems, and the at least one base-side stem aperture is similarly sized to the defined amount of stems.

19 Claims, 8 Drawing Sheets

(56) References Cited

U.S. PATENT DOCUMENTS

| | | | |
|---|---|---|---|
| 1,989,952 A | | 6/1932 | Thomas |
| 3,245,175 A | * | 4/1966 | Klingberg ................ A47G 7/07 |
| | | | D11/143 |
| 3,368,303 A | | 2/1968 | Tong |
| 4,941,572 A | | 7/1990 | Harris |
| 5,115,915 A | | 5/1992 | Harris |
| 10,986,944 B1 | * | 4/2021 | Urrego Bernal ....... B65D 25/10 |
| 2003/0009937 A1 | | 1/2003 | Delaney |
| 2004/0244285 A1 | | 12/2004 | Fishman et al. |
| 2005/0138861 A1 | | 6/2005 | O'Connor |
| 2005/0138862 A1 | | 6/2005 | O'Connor |
| 2005/0155902 A1 | * | 7/2005 | Rooney ................ B65D 85/505 |
| | | | 206/216 |
| 2009/0307971 A1 | | 12/2009 | Driscoll |
| 2016/0242579 A1 | * | 8/2016 | Allan ...................... A01G 5/04 |
| 2019/0261583 A1 | | 8/2019 | DeFoor |

FOREIGN PATENT DOCUMENTS

| | | |
|---|---|---|
| FR | 2732548 A1 | 10/1996 |
| GB | 191014197 A | 4/1911 |
| GB | 104432 A | 3/1917 |
| JP | 5722687 B2 | 5/2015 |
| SE | 514482 C2 | 3/2001 |
| WO | 2016120000 A1 | 8/2016 |
| WO | 2019025448 A1 | 2/2019 |

* cited by examiner

PLANT TRANSPORTATION SYSTEM

CROSS REFERENCE TO RELATED APPLICATIONS

This application is a continuation in part of U.S. patent application Ser. No. 16/875,484, filed on May 15, 2020, now U.S. Pat. No. 10,986,944, issued on Apr. 27, 2021, which is herein incorporated by reference in its entirety.

TECHNICAL FIELD

The embodiments disclosed herein relate to a plant transportation system and, more particularly, to a plant transportation system configurable to serve as the basis for a horticultural arrangement.

BACKGROUND

Vases commonly serve as the basis for horticultural arrangements. In addition to the vases, standard horticultural arrangements include not only plants therein, such as flowers, but also liquid therein, such as water, around their stems. By drawing liquid in the vases through their stems, the plants enjoy prolonged freshness.

Retailers commonly sell horticultural arrangements to consumers. According to one established supply chain, rather than sourcing the actual horticultural arrangements, the retailers source the vases and the plants, and then make the horticultural arrangements onsite. Many retailers source the plants from overseas or otherwise non-local growers. Likewise, after growing the plants, the growers feed the supply chain by shipping the plants to the retailers. To help the plants withstand shipment, the growers typically employ specialty "wet" packaging for the plants. In addition to accommodating the plants, the wet packaging includes liquid therein around their stems. In much the same way as horticultural arrangements, the plants enjoy prolonged freshness by drawing liquid in the wet packaging through their stems. However, because the wet packaging includes liquid therein, the plants must be shipped as wet goods. Moreover, because they source the plants to make the horticultural arrangements onsite, the retailers ultimately dispose of the wet packaging.

For both the growers whose businesses depend on shipping the plants, and the retailers whose businesses depend on making the horticultural arrangements, the supply chain is fragmented and inefficient. For instance, the growers only make profit on the plants, not the horticultural arrangements sold to the consumers. Moreover, before making profit on the plants, the growers must absorb the costs of not only growing the plants, but also employing the wet packaging, and shipping the plants as wet goods. Likewise, before making profit on the horticultural arrangements, the retailers must absorb the costs of not only sourcing the vases and the plants, but also disposing of the wet packaging, and making the horticultural arrangements onsite.

SUMMARY

Disclosed herein are embodiments of a plant transportation system. In one aspect, a plant transportation system includes a vase and a sealant receptacle. The vase includes a mouth, a throat, and a reservoir. The sealant receptacle is housed in the throat. The sealant receptacle is configured to allow a defined amount of stems therethrough, and includes a cover extending across the throat, a base extending across the throat behind the cover, and a sidewall extending behind the cover to the base. The cover defines at least one cover-side stem aperture, the base defines at least one base-side stem aperture, and the sidewall closes the sealant receptacle from the side. The at least one cover-side stem aperture is similarly sized to the defined amount of stems, and the at least one base-side stem aperture is similarly sized to the defined amount of stems.

In another aspect, a plant transportation system includes a vase and a sealant receptacle. The vase includes a mouth, a throat, and a reservoir. The sealant receptacle is housed in the throat. The sealant receptacle is configured to allow a defined amount of stems therethrough, and includes a cover extending across the throat, a base extending across the throat behind the cover, and a sidewall extending behind the cover to the base. The cover defines multiple cover-side stem apertures, the base defines a common base-side stem aperture, and the sidewall closes the sealant receptacle from the side. The cover-side stem apertures are each similarly sized to a share of the defined amount of stems, and the base-side stem aperture is similarly sized to the defined amount of stems.

In yet another aspect, a plant transportation system includes a vase and a sealant receptacle. The vase includes a mouth, a throat, and a reservoir. The sealant receptacle is housed in the throat. The sealant receptacle is configured to allow a defined amount of stems therethrough, and includes a core sleeve, and a jacket fitted around the core sleeve. The jacket extends proximally over the core sleeve to form a cover extending across the throat, and extends terminally over the core sleeve to form a base extending across the throat behind the cover. The core sleeve forms a sidewall extending behind the cover to the base. The cover defines at least one cover-side stem aperture, the base defines at least one base-side stem aperture, and the sidewall closes the sealant receptacle from the side. The at least one cover-side stem aperture is similarly sized to the defined amount of stems, and the at least one base-side stem aperture is similarly sized to the defined amount of stems.

These and other aspects will be described in additional detail below.

BRIEF DESCRIPTION OF THE DRAWINGS

The various features, advantages and other uses of the present embodiments will become more apparent by referring to the following detailed description and drawing in which.

DETAILED DESCRIPTION

Figure 1:
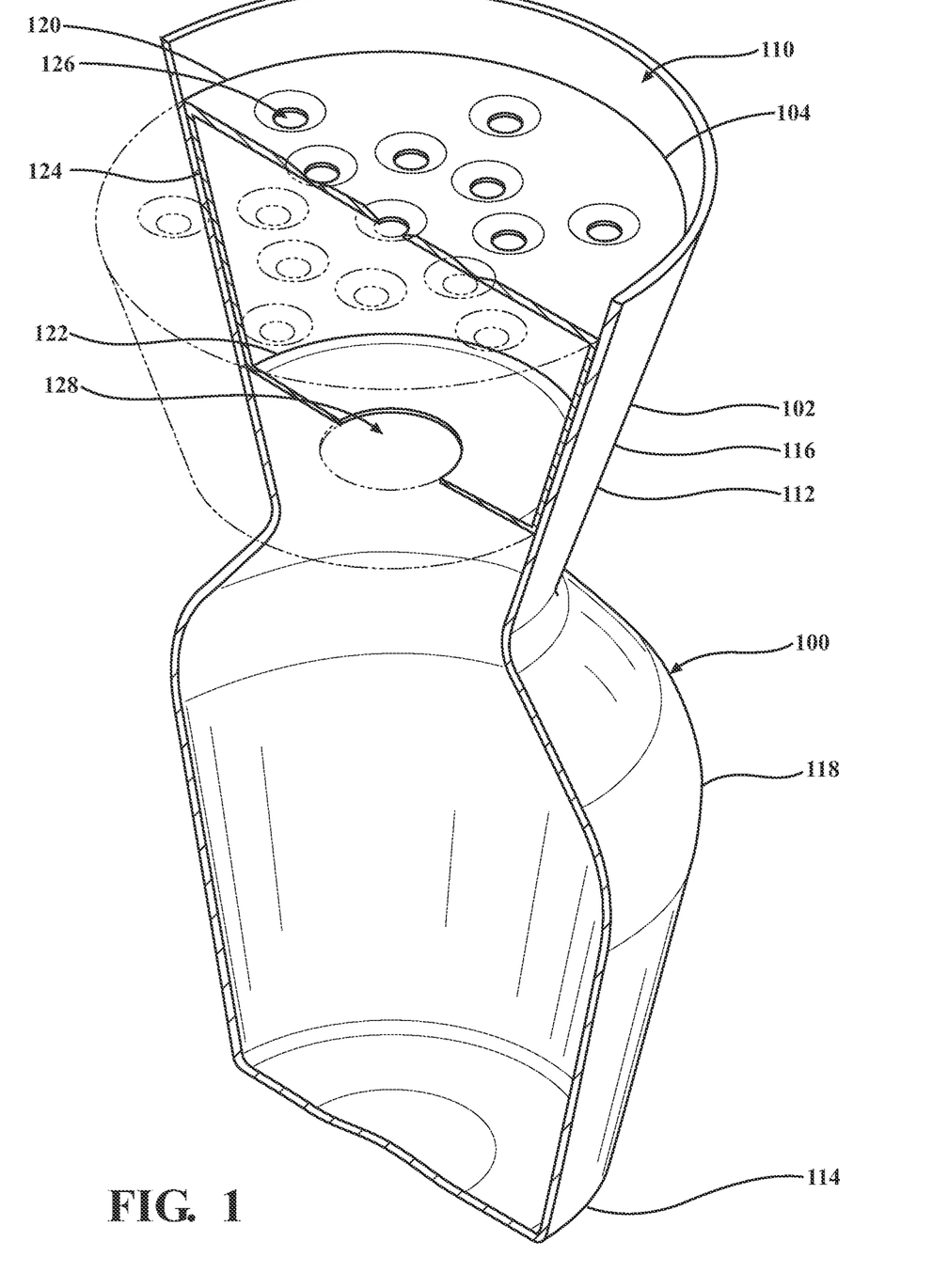
FIG. 1 is a partially cut-away perspective view of a plant transportation system in a dry state, showing a vase that includes a mouth, a throat, and a reservoir, and a representative implementation of a sealant receptacle housed in the throat configured to allow stems therethrough, and retentively hold sealant therein all around occupant stems.

A plant transportation system 100 is shown in FIG. 1. The plant transportation system 100 includes a vase 102, and a representative implementation of a sealant receptacle 104 housed in the vase 102. The plant transportation system 100 is reconfigurable between a "dry" state and a "wet" state. As shown, the plant transportation system 100 is in the dry state. As described in additional detail below, from the dry state, the plant transportation system 100 is reconfigurable to the wet state by the addition of liquid, plants, and sealant. Likewise, from the wet state, the plant transportation system 100 is reconfigurable to the dry state by the removal of previously-added liquid, plants, and sealant.

The vase 102 includes an open-topped, closed-sided, and closed-bottomed hollow construction. As part of its construction, the vase 102 includes an open mouth 110, a tubular sidewall 112, and a closed base 114. The sidewall 112 frames the mouth 110. In spaced opposition with the mouth 110, the base 114 extends across the sidewall 112. As shown, the base 114 serves as the foot of the vase 102. However, it is contemplated that an item besides the base 114 may serve as the foot of the vase 102. The vase 102, including the sidewall 112 and the base 114, is made from impermeable and rigid material, such as polyethylene.

As a related part of its construction, the vase 102 includes regions whose formation is based on the sidewall 112. The regions successively extend behind the mouth 110, and continuously close the vase 102. From top to bottom, the regions include a tubular throat 116 formed by the sidewall 112, and a cuplike reservoir 118 formed by the sidewall 112 and the base 114. The mouth 110 is configured to allow items therethrough. The throat 116 is configured to allow items therethrough, and house the sealant receptacle 104 therein. The reservoir 118 is configured to allow items therein, and store liquid therein. From outside the vase 102, the mouth 110 opens into the throat 116 from the top. Leading from the mouth 110, the throat 116 extends behind the mouth 110, and closes the vase 102 from the side. From inside the vase 102, the throat 116 opens into the reservoir 118 from the top. Leading from the throat 116, the reservoir 118 extends behind the throat 116, and closes the vase 102 from the side and from the bottom. As shown, the throat 116 leads immediately from the mouth 110. Moreover, the reservoir 118 leads immediately from the throat 116. However, it is contemplated that the throat 116 may lead non-immediately from the mouth 110 through one or more intermediate regions. Moreover, it is contemplated that the reservoir 118 may lead non-immediately from the throat 116 through one or more intermediate regions.

The vase 102 has a figure, and, along the regions, includes regional shapes therefor. As shown, having a compound figure, the vase 102 includes distinct regional shapes for the regions. Likewise, the regions have their own distinct regional shapes. However, it is contemplated that, having a simple figure, the vase 102 may include indistinct regional shapes for the regions. Likewise, it is contemplated that the regions may lack their own distinct regional shapes.

As shown, having a thistle-shaped figure, the vase 102 is frustum-shaped along the throat 116, spindle-shaped along the reservoir 118, and hourglass-shaped along the junction between the throat 116 and the reservoir 118. Likewise, having its own distinct regional shape, the throat 116 is frustum-shaped. In particular, the throat 116 is frustoconical. Moreover, having its own distinct regional shape, the reservoir 118 is spindle-shaped. Moreover, the junction between the throat 116 and the reservoir 118 is hourglass-shaped. Accordingly, the throat 116 narrows toward the junction between the throat 116 and the reservoir 118. Likewise, forming a shoulder, the reservoir 118 broadens away from the junction between the throat 116 and the reservoir 118.

As noted above, the sealant receptacle 104 is housed in the vase 102. In particular, the sealant receptacle 104 is housed in the throat 116. Likewise, the sealant receptacle 104 is housed over the reservoir 118. From in the throat 116, the sealant receptacle 104 extends across the throat 116. Extending across the throat 116, the sealant receptacle 104 closes the throat 116 from allowing items therethrough except through the sealant receptacle 104. Moreover, the sealant receptacle 104 extends along the throat 116. In particular, recessed in the throat 116 behind the mouth 110, and otherwise extending along the length of the throat 116, the sealant receptacle 104 extends substantially along the length of the throat 116.

As shown, the sealant receptacle 104 is housed in the throat 116 as a unitary module. As a unitary module, from outside the vase 102, the sealant receptacle 104 is insertable into the throat 116 through the mouth 110. Likewise, the sealant receptacle 104 is removable from and re-insertable into the throat 116 through the mouth 110. Inserted into the throat 116, the sealant receptacle 104 is supported in the throat 116. As shown, similarly to the throat 116, the sealant receptacle 104 is frustum-shaped. In particular, the sealant receptacle 104 is frustoconical. Accordingly, the sealant receptacle 104 is supported by the throat 116 by frustum-in-frustum interfacing. Moreover, the sealant receptacle 104 is lodged in the throat 116 by friction.

As noted above, from the dry state, the plant transportation system 100 is reconfigurable to the wet state by the addition of liquid, plants, and sealant. With respect to the addition of plants, the sealant receptacle 104 is configured to allow stems therethrough, leaving occupant stems inside the sealant receptacle 104, the ends of occupant stems in the reservoir 118, and the tops of the plants to which occupant stems belong over the vase 102. In particular, the sealant receptacle 104 is configured to allow a defined amount of stems therethrough. For instance, as shown, the sealant receptacle 104 is configured to allow a predetermined number of rose stems therethrough. Generally speaking, the defined amount of stems is proportionate to a corresponding amount of plants typically included in horticultural arrangements. Accordingly, although shown with reference to the predetermined number of rose stems, it will be understood that the defined amount of stems may include any combination of one or more numbers of stems, one or more types of stems, one or more sizes of stems, and the like. Likewise, the defined amount of stems may include any combination of stems of plants typical of horticultural arrangements, including stems of other flowers, including stems of focal flowers other than roses, typical of floral arrangements.

With respect to the addition of sealant, the sealant receptacle 104 is configured to retentively hold sealant therein all around occupant stems. In addition to being configured to retentively hold sealant therein from the bottom, the sealant receptacle 104 is configured to retentively hold sealant therein from the top. Moreover, the sealant receptacle 104 is configured to retentively hold sealant therein from the side in isolation from the throat 116.

The sealant receptacle 104 includes a semi-open-topped, semi-closed-bottomed, and closed-sided hollow construction. As part of its construction, the sealant receptacle 104 includes a semi-open cover 120, a semi-open base 122, and a tubular sidewall 124. The sealant receptacle 104, including the cover 120, the base 122, and the sidewall 124, is made from impermeable material. In relation to the cover 120, the base 122, and the sidewall 124, the sealant receptacle 104 may have a unitarily formed construction, in which the cover 120, the base 122, and the sidewall 124 are unitarily formed. Alternatively, the sealant receptacle 104 may have an integrated multi-piece construction, in which the cover 120, the base 122, and the sidewall 124 are formed by multiple pieces that include complementary features for removable securement with one another. The sidewall 124 serves as the structural core of the sealant receptacle 104. Accordingly, the sidewall 124 may be made from rigid material, such as polyethylene. Similarly to the sidewall 124, the cover 120 and the base 122 may be made from rigid material, such as polyethylene. Alternatively, with the sidewall 124 serving as the structural core of the sealant receptacle 104, the cover 120 and the base 122 may be made from elastic material, such as thermoplastic rubber.

Recessed in the throat 116 behind the mouth 110, the cover 120 extends across the throat 116. Extending across the throat 116, the cover 120 closes the throat 116 from allowing items therethrough except through the cover 120. Otherwise closed, the cover 120 defines one or more cover-side stem apertures 126 (i.e., at least one cover-side stem aperture 126) for allowing stems therethrough. As shown, the cover 120 defines multiple cover-side stem apertures 126 for allowing stems therethrough. From outside the sealant receptacle 104, the cover-side stem apertures 126 lead into the sealant receptacle 104, and toward the reservoir 118, from the top. The cover-side stem apertures 126 are configured to allow stems therethrough. Likewise, the cover 120 is configured to allow stems therethrough through the cover-side stem apertures 126. Moreover, to retentively hold sealant in the sealant receptacle 104 from the top, the cover-side stem apertures 126 are configured to inhibit sealant from escaping therethrough around occupant stems. Likewise, the cover 120 is configured to inhibit sealant from escaping therethrough through the cover-side stem apertures 126 around occupant stems.

Intermediately along the throat 116, in spaced opposition with the cover 120, the base 122 extends across the throat 116 behind the cover 120. Extending across the throat 116, the base 122 closes the throat 116 from allowing items therethrough except through the base 122. Otherwise closed, the base 122 defines one or more base-side stem apertures 128 (i.e., at least one base-side stem aperture 128) for allowing stems therethrough. As shown, the base 122 defines a single, common base-side stem aperture 128 for allowing stems therethrough. From inside the sealant receptacle 104, the base-side stem aperture 128 leads out of the sealant receptacle 104, and toward the reservoir 118, from the top. The base-side stem aperture 128 is configured to allow stems therethrough. Likewise, the base 122 is configured to allow stems therethrough through the base-side stem aperture 128. Moreover, to retentively hold sealant in the sealant receptacle 104 from the bottom, the base-side stem aperture 128 is configured to inhibit sealant from escaping therethrough around occupant stems. Likewise, the base 122 is configured to inhibit sealant from escaping therethrough through the base-side stem aperture 128 around occupant stems.

To retentively hold sealant in the sealant receptacle 104 from the side in isolation from the throat 116, leading from the cover 120, the sidewall 124 extends behind the cover 120 to the base 122, and closes the sealant receptacle 104 from the side.

To allow stems therethrough, the sealant receptacle 104 defines stem passageways therethrough successively through the cover-side stem apertures 126 and the base-side stem aperture 128. As shown, to separate occupant stems from one another inside the sealant receptacle 104, and promote the presence of sealant in the sealant receptacle 104 all around occupant stems, the cover-side stem apertures 126 are distributed on the cover 120. In particular, the cover-side stem apertures 126 are peripherally, intermediately, and centrally arranged on the cover 120. Moreover, to both disperse the ends of occupant stems from one another in the reservoir 118, and disperse the tops of the plants to which occupant stems belong from one another over the vase 102, the base-side stem aperture 128 is centrally arranged on the base 122.

As noted above, the cover 120 defines multiple cover-side stem apertures 126 for allowing stems therethrough. With respect to the defined amount of stems, collectively configured to allow the defined amount of stems therethrough, the cover-side stem apertures 126 are each configured to allow a share of the defined amount of stems therethrough. For instance, with respect to the predetermined number of rose stems, the cover 120 defines the same predetermined number of cover-side stem apertures 126, with the cover-side stem apertures 126 each configured to allow one rose stem therethrough, and collectively configured to allow the predetermined number of rose stems therethrough. In other implementations, it is contemplated that the cover 120 may define a single, common cover-side stem aperture 126 configured to allow the defined amount of stems therethrough.

To inhibit sealant from escaping therethrough around occupant stems, the cover-side stem apertures 126 are similarly sized to the defined amount of stems. In particular, collectively similarly sized to the defined amount of stems, the cover-side stem apertures 126 are each similarly sized to a share of the defined amount of stems. Relatedly, the cover-side stem apertures 126 are each configured to allow a share of the defined amount of stems therethrough with a clearance, elastic stretch, or otherwise close fit. Accordingly, gapping between the cover-side stem apertures 126 and occupant stems, if any, is minimal enough to inhibit sealant from escaping through the cover-side stem apertures 126 around occupant stems. For instance, as noted above, the cover 120 may be made from rigid material. With the cover 120 made from rigid material, the cover-side stem apertures 126, as defined by the cover 120, are fixed. Accordingly, the cover-side stem apertures 126 may be each slightly oversized to a share of the defined amount of stems, and configured to allow a share of the defined amount of stems therethrough with a clearance fit. As also noted above, alternatively, the cover 120 may be made from elastic material. With the cover 120 made from elastic material, the cover-side stem apertures 126, as defined by the cover 120, are elastic. Accordingly, the cover-side stem apertures 126 may be each slightly undersized to a share of the defined amount of stems, and configured to allow a share of the defined amount of stems therethrough with an elastic stretch fit.

As noted above, the base 122 defines a single, common base-side stem aperture 128 for allowing stems therethrough. With respect to the defined amount of stems, the base-side stem aperture 128 is configured to allow the defined amount of stems therethrough. In other implementations, it is contemplated that the base 122 may, similarly to the cover 120, define multiple base-side stem apertures 128 each configured to allow a share of the defined amount of stems therethrough.

To inhibit sealant from escaping therethrough around occupant stems, the base-side stem aperture 128 is similarly sized to the defined amount of stems. Relatedly, the base-side stem aperture 128 is configured to allow the defined amount of stems therethrough with a clearance, elastic stretch, or otherwise close fit. Accordingly, gapping between the base-side stem aperture 128 and occupant stems, if any, is minimal enough to inhibit sealant from escaping through the base-side stem aperture 128 around occupant stems. For instance, as noted above, the base 122 may be made from rigid material. With the base 122 made from rigid material, the base-side stem aperture 128, as defined by the base 122, is fixed. Accordingly, the base-side stem aperture 128 may be slightly oversized to the defined amount of stems, and configured to allow the defined amount of stems therethrough with a clearance fit. As also noted above, alternatively, the base 122 may be made from elastic material. With the base 122 made from elastic material, the base-side stem aperture 128, as defined by the base 122, is elastic. Accordingly, the base-side stem aperture 128 may be slightly undersized to the defined amount of stems, and configured to allow the defined amount of stems therethrough with an elastic stretch fit.

As noted above, from the dry state, the plant transportation system 100 is reconfigurable to the wet state by the addition of liquid, plants, and sealant. As shown with additional reference to FIGS. 2A-2E, in the wet state, the plant transportation system 100 serves as the basis for a transportable, consumer-ready horticultural arrangement 130. Likewise, as shown, the operations of a method for making the horticultural arrangement 130 include reconfiguring the plant transportation system 100 from the dry state to the wet state by the addition of liquid, plants, and sealant. Although portrayed with reference to the representative implementation of the sealant receptacle 104 shown in FIG. 1, it will be understood that the method for making the horticultural arrangement 130 is applicable in principle to other implementations of the sealant receptacle 104, including the implementation shown in FIGS. 4A and 4B, and the implementation shown in FIGS. 5A-5C Likewise, although portrayed with reference to roses as the plants, and with corresponding reference to a floral arrangement as the horticultural arrangement 130, it will be understood that the method for making the horticultural arrangement 130 is applicable in principle to other plants typical of horticultural arrangements, including other flowers, including focal flowers other than roses, typical of floral arrangements.

Figures 2A, 2B, 2C, 2D, 2E:
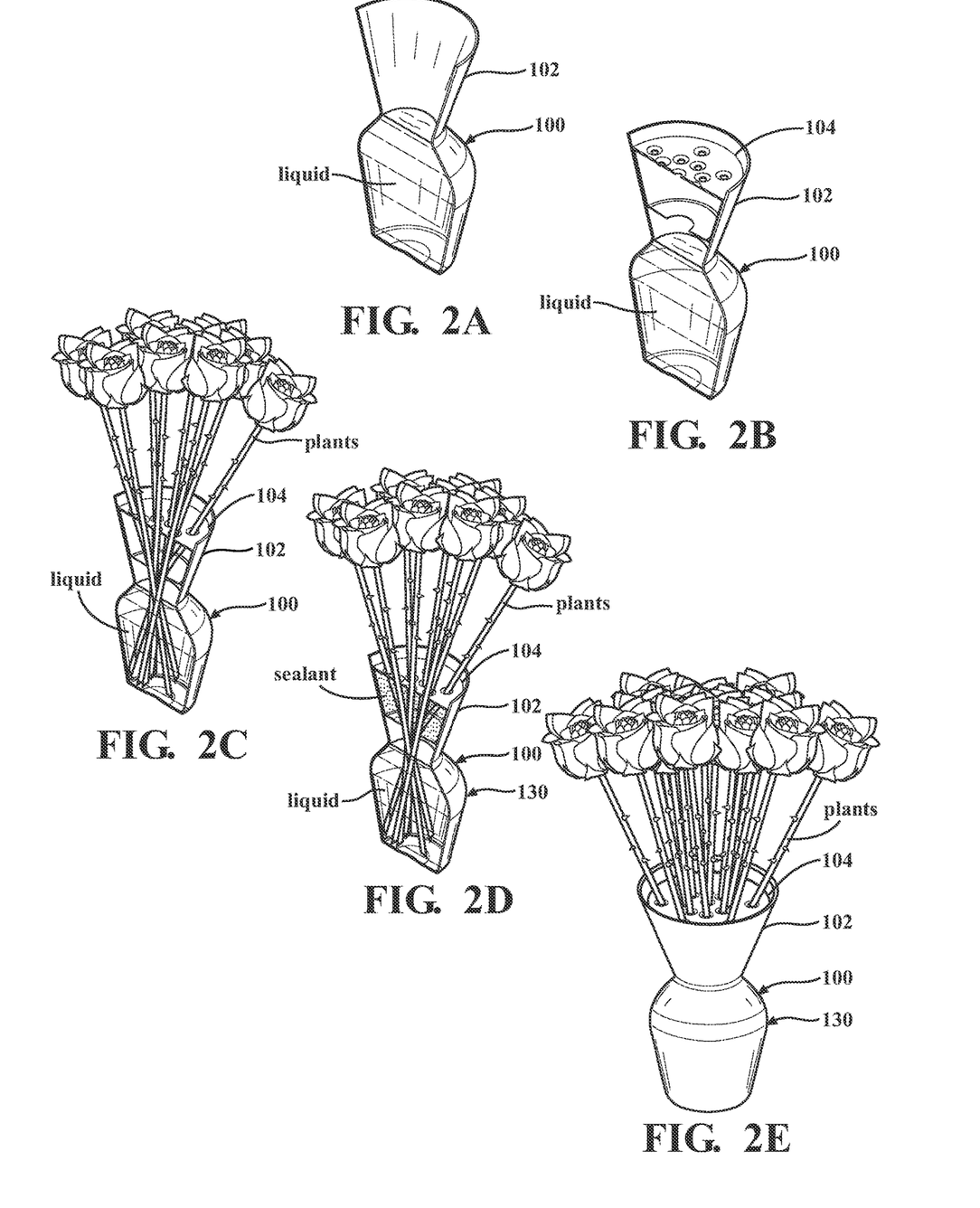
FIGS. 2A-2E portray the operations of a method for making a horticultural arrangement, showing the plant transportation system being reconfigured from the dry state to a wet state by the addition of liquid, plants, and sealant, and, in the wet state, serving as the basis for the horticultural arrangement.

As shown in FIG. 2A, with the sealant receptacle 104 removed from the throat 116 through the mouth 110, the reservoir 118 is filled with liquid, such as water, including pure water and water mixtures, through the mouth 110. As shown, the reservoir 118 is filled with liquid up to or otherwise below the junction between the throat 116 and the reservoir 118.

As shown in FIG. 2B, with liquid in the reservoir 118, the sealant receptacle 104 is inserted into the throat 116 through the mouth 110 until housed in the throat 116, and, likewise, over the reservoir 118, including liquid in the reservoir 118. As shown, the sealant receptacle 104 is inserted into the throat 116 through the mouth 110 as a unitary module. Alternatively, depending on its construction, it is contemplated that the sealant receptacle 104 may be inserted into the throat 116 through the mouth 110 piece-by-piece.

As shown in FIG. 2C, with the sealant receptacle 104 housed in the throat 116, stems are inserted through the sealant receptacle 104, and, in particular, successively through the cover-side stem apertures 126 and the base-side stem aperture 128, leaving occupant stems inside the sealant receptacle 104, the ends of occupant stems in the reservoir 118, and the tops of the plants to which occupant stems belong over the vase 102. By drawing liquid in the reservoir 118 therethrough, the plants to which occupant stems belong enjoy prolonged freshness. As shown, the ends of occupant stems are dispersed from one another in the reservoir 118, promoting the draw of liquid in the reservoir 118 therethrough. Moreover, the tops of the plants to which occupant stems belong are dispersed from one another over the vase 102, promoting the fullness of the horticultural arrangement 130.

As shown in FIG. 2D, with occupant stems inside the sealant receptacle 104, the sealant receptacle 104 is filled with sealant. In particular, the sealant receptacle 104 is filled with sealant between the cover 120 and the base 122, including, with occupant stems therethrough, to the cover-side stem apertures 126 and to the base-side stem aperture 128. At the same time, the sealant receptacle 104 is filled with sealant to the sidewall 124. As shown, occupant stems are separated from one another inside the sealant receptacle 104, promoting the presence of sealant in the sealant receptacle 104 all around occupant stems. With the cover-side stem apertures 126 inhibiting sealant from escaping therethrough around occupant stems, and the base-side stem aperture 128 inhibiting sealant from escaping therethrough around occupant stems, the sealant receptacle 104 retentively holds sealant therein all around occupant stems from the top and from the bottom. Moreover, with the sidewall 124 closing the sealant receptacle 104 from the side, the sealant receptacle 104 retentively holds sealant therein from the side in isolation from the throat 116.

The sealant is configured to prevent liquid from penetrating therethrough. With the sealant receptacle 104 retentively holding sealant therein all around occupant stems, liquid in the reservoir 118 is sealed from evaporating, splashing, pouring, or otherwise leaving the reservoir 118. In one implementation, the sealant is a semi-liquid. In particular, the sealant is pre-hydrated super absorbent polymer (SAP) powder. Because pre-hydrated SAP powder and like semi-liquids are both freeform and non-solidifying, their employment as the sealant promotes not only effective sealing of liquid in the reservoir 118, but also later removal from the sealant receptacle 104. With the sealant receptacle 104 retentively holding sealant therein all around occupant stems from the top, the tops of the plants to which occupant stems belong do not suffer the threat of becoming soiled by sealant in the sealant receptacle 104. Similarly, with the sealant receptacle 104 retentively holding sealant therein all around occupant stems from the bottom, liquid in the reservoir 118 does not suffer the threat of becoming contaminated by sealant in the sealant receptacle 104. Moreover, with the sealant receptacle 104 retentively holding sealant therein from the side in isolation from the throat 116, the vase 102 does not suffer the threat of becoming dirtied by sealant in the sealant receptacle 104.

As shown in FIG. 2E, with the plant transportation in the wet state, the resulting horticultural arrangement 130 is not only consumer-ready, but also transportable. Among other advantages, despite the presence of liquid in the reservoir 118, the horticultural arrangement 130 may be shipped in bulk with like horticultural arrangements 130 as dry goods. At the same time, because of the presence of liquid in the reservoir 118, with the plants enjoying prolonged freshness, the horticultural arrangement 130 enjoys both prolonged shelf life in the hands of retailers, and prolonged service life in the hands of consumers. Accordingly, taking advantage of the plant transportation system 100 to make the horticultural arrangement 130, overseas and otherwise non-local growers may make profits on not only the plants, but also the horticultural arrangement 130 sold to the consumers. Moreover, the growers may avoid the costs of employing wet packaging, and shipping plants as wet goods. Likewise, the retailers may avoid the costs of not only making the horticultural arrangement 130 onsite, but also sourcing the vase 102, and disposing of wet packaging.

Moreover, as noted above, from the wet state, the plant transportation system 100 is reconfigurable to the dry state by the removal of previously-added liquid, plants, and sealant. In the dry state, the plant transportation system 100 is reusable, in whole or in part. For instance, either the consumers or the retailers may return the plant transportation system 100 to the growers, where, back in the hands of the growers, it may serve as the basis for a new horticultural arrangement 130. Alternatively, either the consumers or the retailers may return the sealant receptacle 104 to the growers, but keep the vase 102. In the hands of the consumers or the retailers, as the case may be, the vase 102 may serve uses typical of vases, including serving as the basis for standard horticultural arrangements.

Figure 3A:
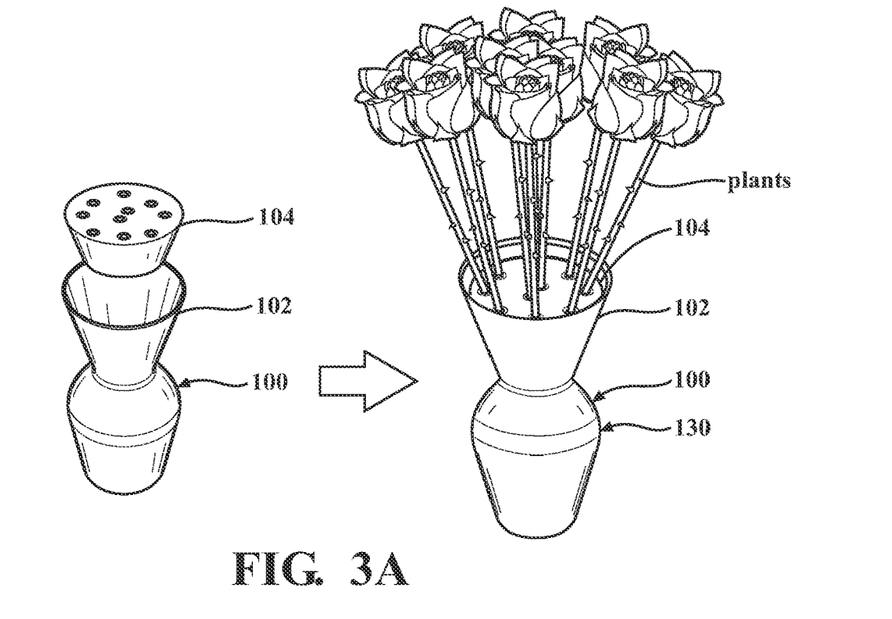
FIGS. 3A and 3B are assembly views of the plant transportation system in the dry state, and perspective views of the plant transportation system in the wet state, showing aspects of the scalability of the plant transportation system.
Figure 3B:
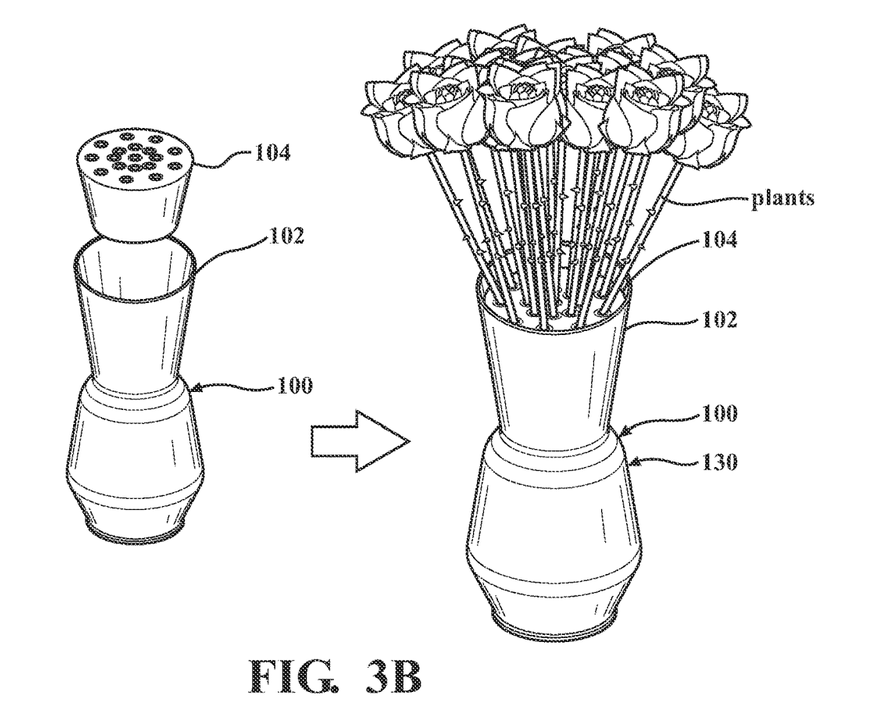

Moreover, as shown with additional reference to FIGS. 3A and 3B, the plant transportation system 100 is straightforwardly scalable. Although portrayed with reference to the representative implementation of the sealant receptacle 104 shown in FIG. 1, it will be understood that the scalability of the plant transportation system 100 is applicable in principle to other implementations of the sealant receptacle 104, including the implementation shown in FIGS. 4A and 4B, and the implementation shown in FIGS. 5A-5C.

As shown in FIG. 1, the plant transportation system 100 has a medium size. From the medium size, the plant transportation system 100 is scalable to other sizes, including in relation to the defined amount of stems. For instance, as shown in FIG. 3A, in conjunction with narrowing the vase 102 and narrowing the sealant receptacle 104, the plant transportation system 100 is scalable to a small size by downsizing the cover-side stem apertures 126 and the base-side stem aperture 128 for a new, lesser defined amount of stems. Contrariwise, as shown in FIG. 3B, in conjunction with widening the vase 102 and widening the sealant receptacle 104, the plant transportation system 100 is scalable to a large size by upsizing the cover-side stem apertures 126 and the base-side stem aperture 128 for a new, greater defined amount of stems. Likewise, as shown, depending on the size of the plant transportation system 100, the predetermined number of rose stems, and the same predetermined number of cover-side stem apertures 126, may be between ten and eighteen inclusive. In particular, the predetermined number of rose stems, and the same predetermined number of cover-side stem apertures 126, may be ten when the plant transportation system 100 is scaled to the small size, fifteen when the plant transportation system 100 is scaled to the medium size, and eighteen when the plant transportation system 100 is scaled to the large size.

Figure 4A:
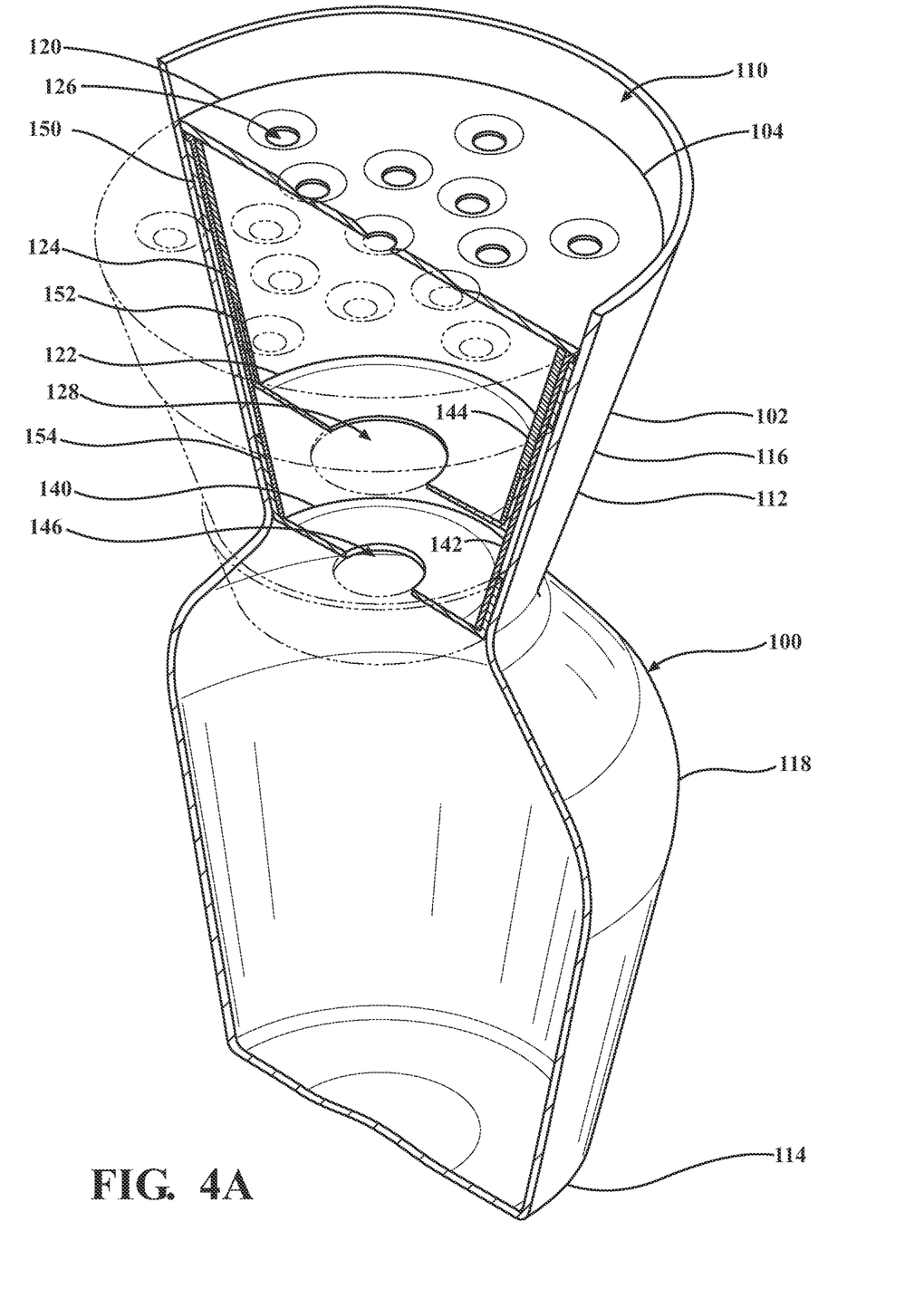
FIGS. 4A and 5A are partially cut-away perspective views of the plant transportation system in the dry state, showing implementations of the sealant receptacle.
Figure 4B:
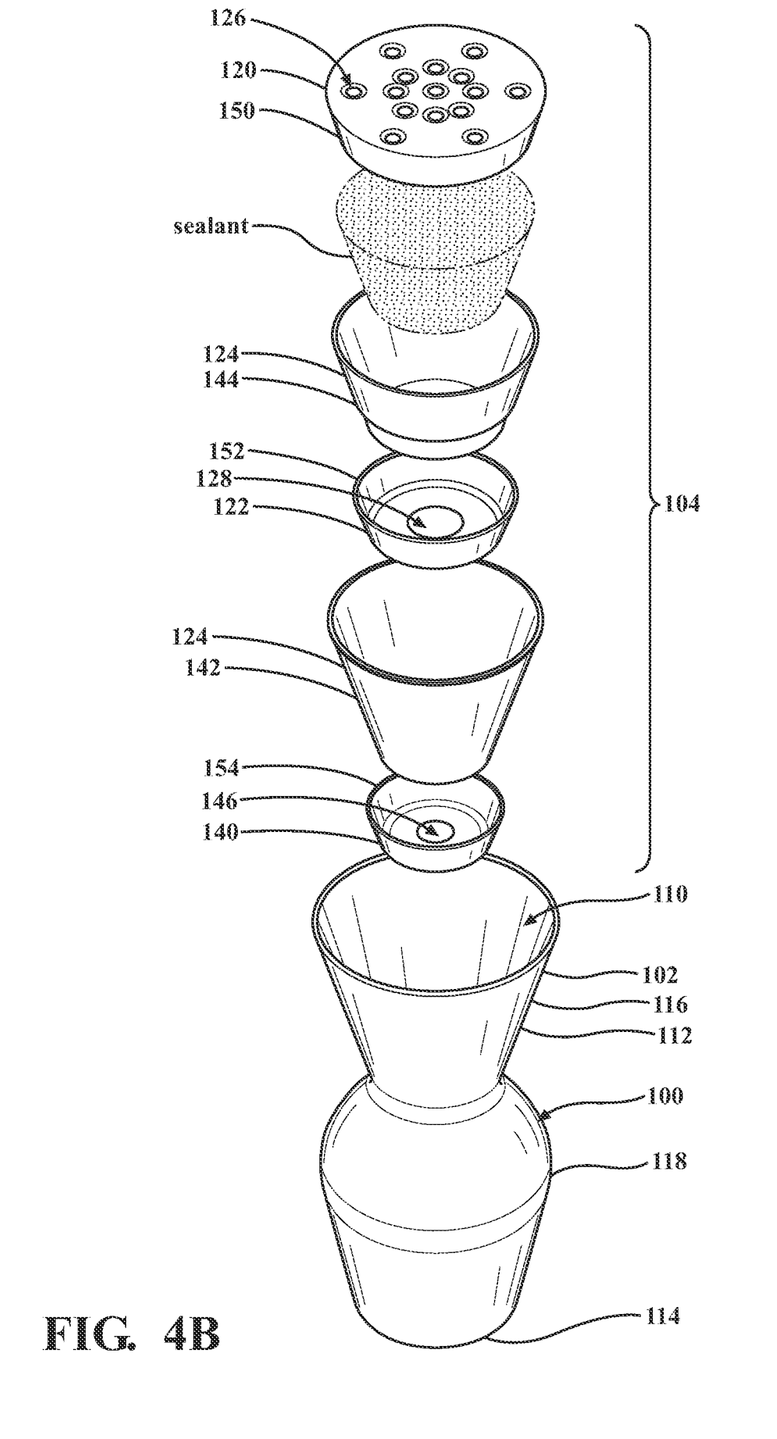
FIGS. 4B, 5B, and 5C are assembly views of the plant transportation system in the dry state, showing aspects of the constructions of the implementations of the sealant receptacle shown in FIGS. 4A and 5A.

An implementation of the sealant receptacle 104 is shown in FIGS. 4A and 4B. As noted above with reference to the representative implementation of the sealant receptacle 104 shown in FIG. 1, the sealant receptacle 104 is configured to retentively hold sealant therein all around occupant stems from the top and from the bottom. Moreover, the sealant receptacle 104 is configured to retentively hold sealant therein from the side in isolation from the throat 116. Furthermore, in the instant implementation, the sealant receptacle 104 is configured to retentively hold escaping sealant, if any, therein from the bottom. Moreover, the sealant receptacle 104 is configured to retentively hold escaping sealant therein from the side in isolation from the throat 116.

As part of its construction, in addition to the semi-open cover 120, the semi-open base 122, and the tubular sidewall 124, the sealant receptacle 104 includes a semi-open catch 140. In relation to the cover 120, the base 122, the catch 140, and the sidewall 124, the sealant receptacle 104 has an integrated multi-piece construction. As shown, the sealant receptacle 104 includes a cap-like piece forming the cover 120, a tray-like piece forming the base 122, a tray-like piece forming the catch 140, and tubular sleeving 142, 144, rendered by a tubular outer sleeve 142 and a tubular inner sleeve 144, forming the sidewall 124. Forming the sidewall 124, the sleeving 142, 144, including the outer sleeve 142 and the inner sleeve 144, serves as the structural core of the sealant receptacle 104. Accordingly, the sleeving 142, 144 may be made from rigid material, such as polyethylene. Similarly to the sleeving 142, 144, the catch 140 may, like the cover 120 and the base 122, be made from rigid material, such as polyethylene. Alternatively, with the sleeving 142, 144 serving as the structural core of the sealant receptacle 104, the catch 140 may, like the cover 120 and the base 122, be made from elastic material, such as thermoplastic rubber.

Terminally along the throat 116, in spaced opposition with the base 122, the catch 140 extends across the throat 116 behind the base 122. Extending across the throat 116, the catch 140 closes the throat 116 from allowing items therethrough except through the catch 140. Otherwise closed, the catch 140 defines one or more catch-side stem apertures 146 (i.e., at least one catch-side stem aperture 146) for allowing stems therethrough. As shown, the catch 140, similarly to the base 122, defines a single, common catch-side stem aperture 146 for allowing stems therethrough. From inside the sealant receptacle 104, the catch-side stem aperture 146 leads out of the sealant receptacle 104, and toward the reservoir 118, from the top. The catch-side stem aperture 146 is configured to allow stems therethrough. Likewise, the catch 140 is configured to allow stems therethrough through the catch-side stem aperture 146. Moreover, to retentively hold escaping sealant in the sealant receptacle 104 from the bottom, the catch-side stem aperture 146 is configured to inhibit escaping sealant from escaping therethrough around occupant stems. Likewise, the catch 140 is configured to inhibit escaping sealant from escaping therethrough through the catch-side stem aperture 146 around occupant stems.

As noted above, the sleeving 142, 144 is rendered by the outer sleeve 142 and the inner sleeve 144. As part of the sleeving 142, 144, from outside the inner sleeve 144, the outer sleeve 142 is stacked between the cover 120 and the catch 140. Moreover, from inside the outer sleeve 142, the inner sleeve 144 is stacked between the cover 120 and the base 122. To retentively hold sealant in the sealant receptacle 104 from the side in isolation from the throat 116, leading from the cover 120, the inner sleeve 144 extends behind the cover 120 to the base 122, and closes the sealant receptacle 104 from the side. Leading from the cover 120, the outer sleeve 142 extends behind the cover 120 past the base 122. To retentively hold escaping sealant in the sealant receptacle 104 from the side in isolation from the throat 116, leading from the base 122, the outer sleeve 142 extends behind the base 122 to the catch 140, and closes the sealant receptacle 104 from the side.

To allow stems therethrough, the sealant receptacle 104 defines stem passageways therethrough successively through the cover-side stem apertures 126, the base-side stem aperture 128, and the catch-side stem aperture 146. In furtherance to both dispersing the ends of occupant stems from one another in the reservoir 118, and dispersing the tops of the plants to which occupant stems belong from one another over the vase 102, similarly to the base-side stem aperture 128 on the base 122, the catch-side stem aperture 146 is centrally arranged on the catch 140.

As noted above, the catch 140 defines a single, common catch-side stem aperture 146 for allowing stems therethrough. With respect to the defined amount of stems, the catch-side stem aperture 146 is configured to allow the defined amount of stems therethrough. In other implementations, it is contemplated that the catch 140 may, similarly to the cover 120, define multiple catch-side stem apertures 146 each configured to allow a share of the defined amount of stems therethrough.

To inhibit escaping sealant from escaping therethrough around occupant stems, the catch-side stem aperture 146 is similarly sized to the defined amount of stems. Relatedly, the catch-side stem aperture 146 is configured to allow the defined amount of stems therethrough with a clearance, elastic stretch, or otherwise close fit. Accordingly, gapping between the catch-side stem aperture 146 and occupant stems, if any, is minimal enough to inhibit escaping sealant from escaping through the catch-side stem aperture 146 around occupant stems. For instance, as noted above, the catch 140 may be made from rigid material. With the catch 140 made from rigid material, the catch-side stem aperture 146, as defined by the catch 140, is fixed. Accordingly, the catch-side stem aperture 146 may be slightly oversized to the defined amount of stems, and configured to allow the defined amount of stems therethrough with a clearance fit. As also noted above, alternatively, the catch 140 may be made from elastic material. With the catch 140 made from elastic material, the catch-side stem aperture 146, as defined by the catch 140, is elastic. Accordingly, the catch-side stem aperture 146 may be slightly undersized to the defined amount of stems, and configured to allow the defined amount of stems therethrough with an elastic stretch fit.

As shown with particular reference to FIG. 4B, according to the integrated multi-piece construction of the sealant receptacle 104, the cover 120, the base 122, the catch 140, and the sleeving 142, 144, including the outer sleeve 142 and the inner sleeve 144, include complementary features for removable securement with one another. As noted above, the sleeving 142, 144, including the outer sleeve 142 and the inner sleeve 144, serves as the structural core of the sealant receptacle 104. As shown, in relation to the sleeving 142, 144, the cover 120 includes an annular downturned edge 150 thereon, the base 122 includes an annular upturned edge 152 thereon, and the catch 140 includes an annular upturned edge 154 thereon.

With respect to the base 122, the upturned edge 152 is removably secured terminally around the inner sleeve 144. With the upturned edge 152 removably secured terminally around the inner sleeve 144, the base 122 and the inner sleeve 144 are inserted into the outer sleeve 142 as a unitary submodule. Inserted into the outer sleeve 142, the base 122 and the inner sleeve 144 are supported in the outer sleeve 142 intermediately along the outer sleeve 142. With the base 122 and the inner sleeve 144 supported in the outer sleeve 142, with respect to the cover 120, the downturned edge 150 is removably secured proximally around the outer sleeve 142, and, with respect to the catch 140, the upturned edge 154 is removably secured terminally around the outer sleeve 142. As shown, following the frustum-shaped configuration of the sealant receptacle 104, the outer sleeve 142 and the inner sleeve 144 are frustum-shaped. Likewise, the downturned edge 150, the upturned edge 152, and the upturned edge 154, for removable securement proximally around the outer sleeve 142, terminally around the inner sleeve 144, and terminally around the outer sleeve 142, respectively, are frustum-shaped. In particular, the outer sleeve 142 and the inner sleeve 144 are frustoconical. Likewise, the downturned edge 150, the upturned edge 152, and the upturned edge 154 are frustoconical.

As noted above, the cover 120, the base 122, and the catch 140 may be made from rigid material. With the cover 120, the base 122, and the catch 140 made from rigid material, the downturned edge 150, the upturned edge 152, and the upturned edge 154 are fixed. Accordingly, the downturned edge 150, the upturned edge 152, and the upturned edge 154 may be slightly oversized to proximally around the outer sleeve 142, terminally around the inner sleeve 144, and terminally around the outer sleeve 142, respectively, and configured for removable securement therearound with a push fit. As also noted above, alternatively, the cover 120, the base 122, and the catch 140 may be made from elastic material. With the cover 120, the base 122, and the catch 140 made from elastic material, the downturned edge 150, the upturned edge 152, and the upturned edge 154 are elastic. Accordingly, the downturned edge 150, the upturned edge 152, and the upturned edge 154 may be slightly undersized to proximally around the outer sleeve 142, terminally around the inner sleeve 144, and terminally around the outer sleeve 142, respectively, and configured for removable securement therearound with an elastic stretch fit.

According to the method for making the horticultural arrangement 130, when inserted through the sealant receptacle 104, stems are inserted successively through the cover-side stem apertures 126, the base-side stem aperture 128, and the catch-side stem aperture 146. When the sealant receptacle 104 is filled with sealant, the sealant receptacle 104 is filled with sealant to the sleeving 142, 144, and, in particular, to the inner sleeve 144. With the inner sleeve 144 closing the sealant receptacle 104 from the side, the sealant receptacle 104 retentively holds sealant therein from the side in isolation from the throat 116. With the catch-side stem aperture 146 inhibiting escaping sealant from escaping therethrough around occupant stems, the sealant receptacle 104 retentively holds escaping sealant, if any, therein from the bottom. Moreover, with the outer sleeve 142 closing the sealant receptacle 104 from the side, the sealant receptacle 104 retentively holds escaping sealant in the sealant receptacle 104 from the side in isolation from the throat 116.

Figure 5A:
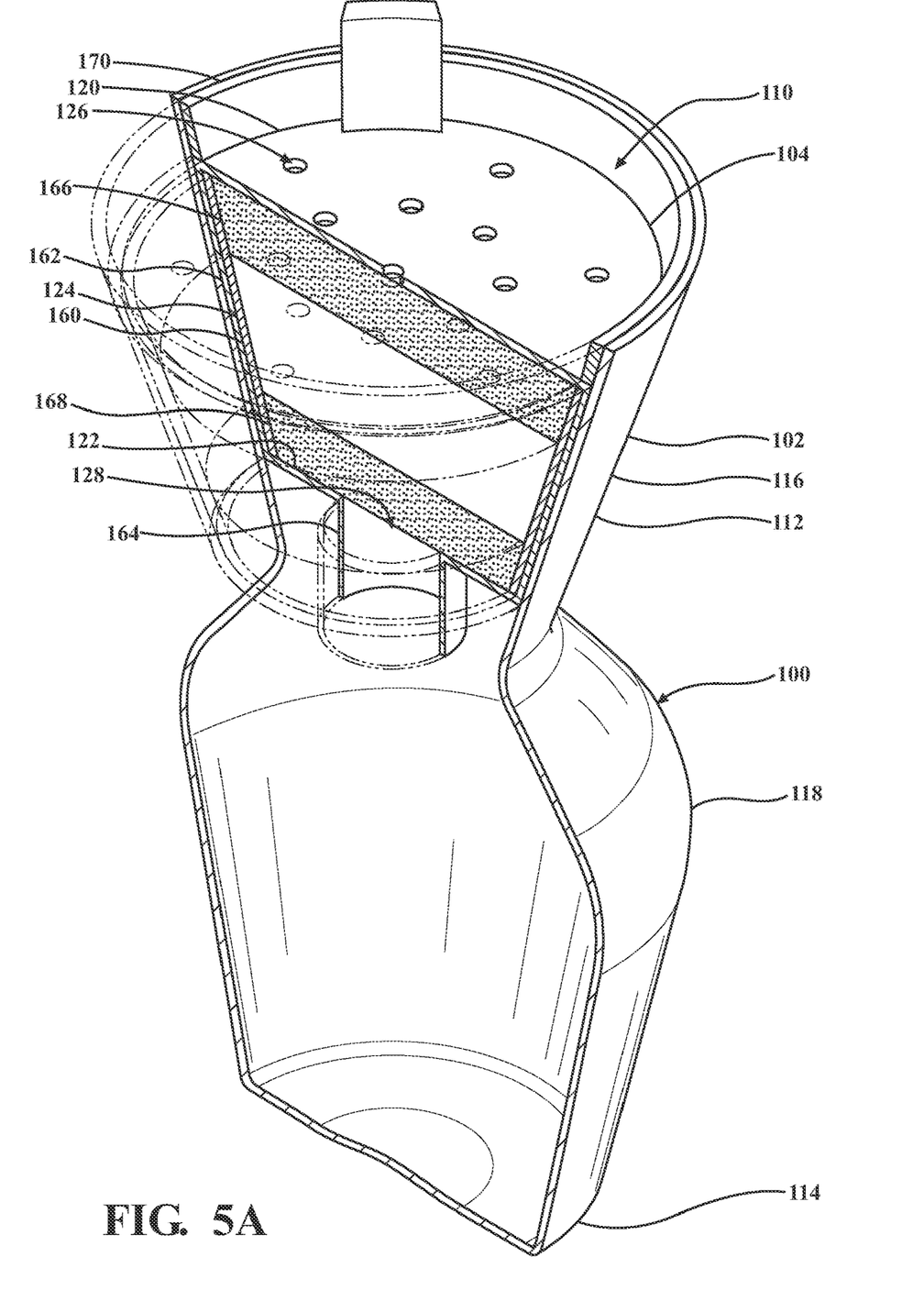
Figure 5B:
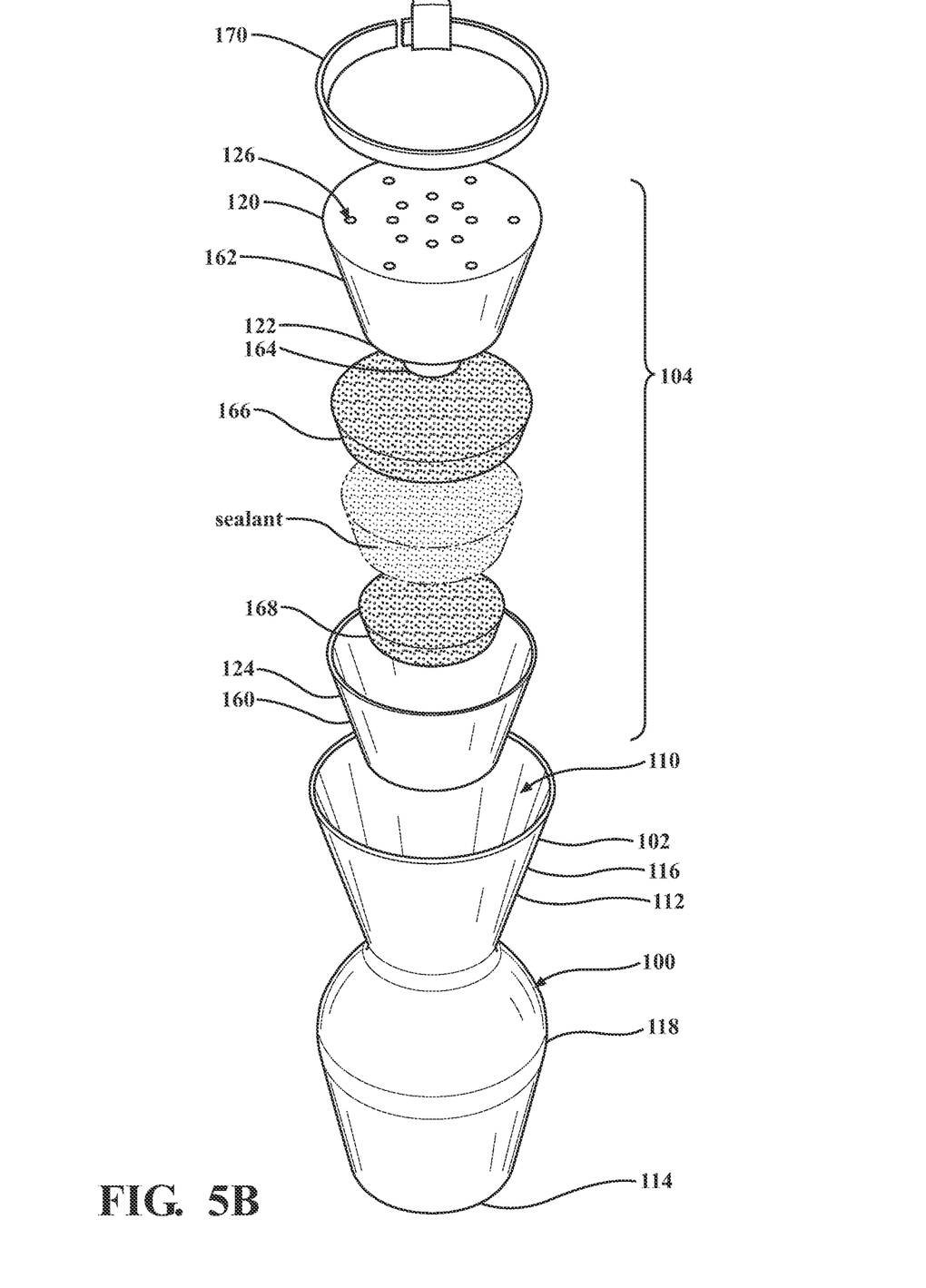
Figure 5C:
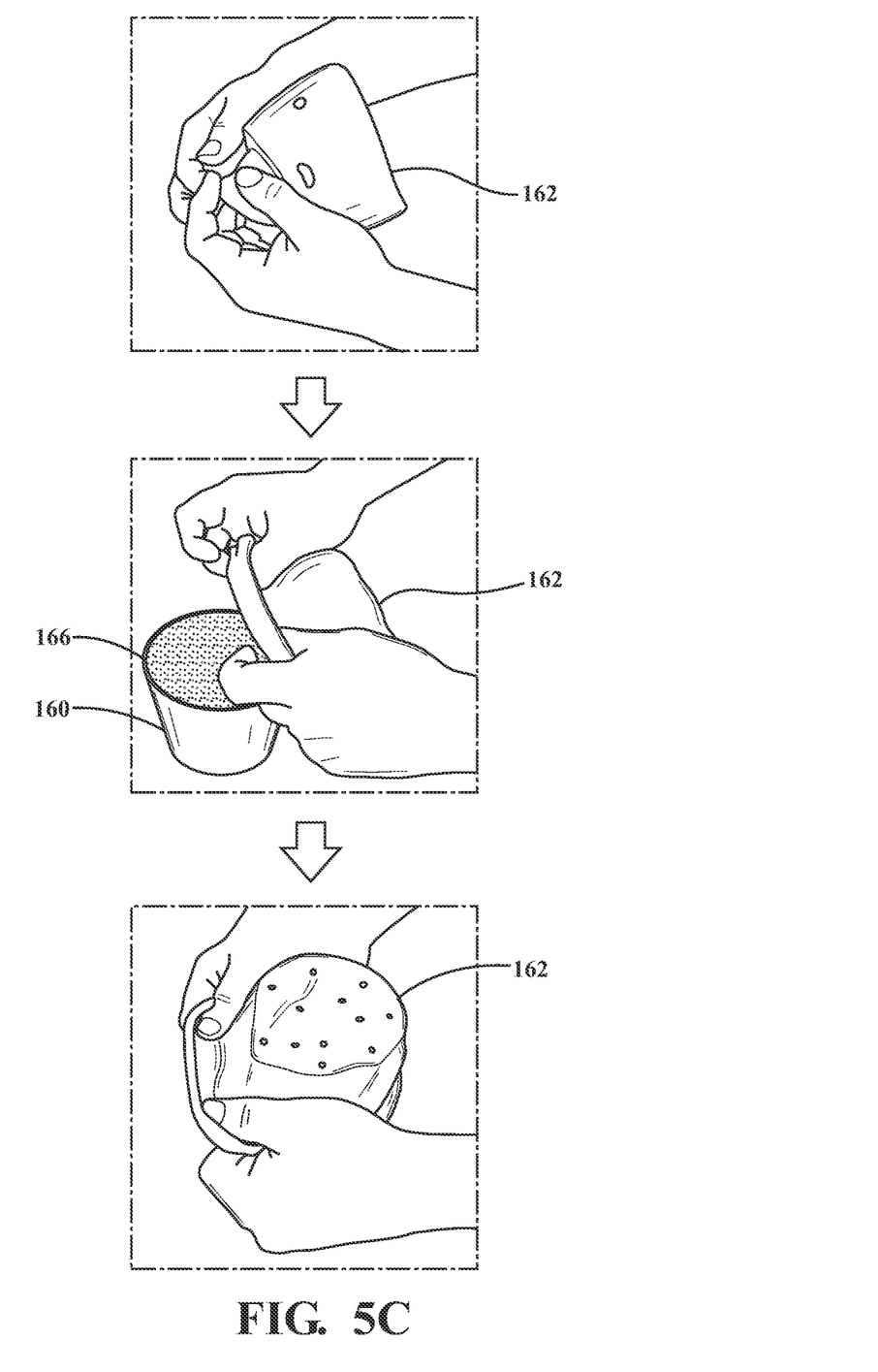

An additional implementation of the sealant receptacle 104 is shown in FIGS. 5A-5C. As noted above with reference to the representative implementation of the sealant receptacle 104 shown in FIG. 1, as part of its construction, the sealant receptacle 104 includes the semi-open cover 120, the semi-open base 122, and the tubular sidewall 124. In the instant implementation, in relation to the cover 120, the base 122, and the sidewall 124, the sealant receptacle 104 has an integrated multi-piece construction. As shown, the sealant receptacle 104 includes a tubular core sleeve 160, and a jacket 162 fitted around the core sleeve 160. The core sleeve 160 forms the sidewall 124. Fitted around the core sleeve 160, the jacket 162 extends along the core sleeve 160 to cover the sidewall 124, proximally over the core sleeve 160 to form the cover 120, and terminally over the core sleeve 160 to form the base 122. As shown, the base 122, as formed by the jacket 162, includes a tubular base-side stem collar 164. Leading from the base-side stem aperture 128, the base-side stem collar 164 is configured to allow stems therethrough as a same-sized extension of the base-side stem aperture 128. Forming the sidewall 124, the core sleeve 160 serves as the structural core of the sealant receptacle 104. Accordingly, the core sleeve 160 may be made from rigid material, such as polyethylene. Fitted around the core sleeve 160, with the core sleeve 160 serving as the structural core of the sealant receptacle 104, the jacket 162 may be made from elastic material, such as thermoplastic rubber.

With the jacket 162 made from elastic material, the cover 120, as formed by the jacket 162, is made from elastic material. And, with the cover 120 made from elastic material, the cover-side stem apertures 126, as defined by the cover 120, are elastic. Accordingly, to inhibit sealant from escaping therethrough around occupant stems, the cover-side stem apertures 126 may be each slightly undersized to a share of the defined amount of stems, and configured to allow a share of the defined amount of stems therethrough with an elastic stretch fit. Similarly, the base 122, as formed by the jacket 162, is made from elastic material. And, with the base 122 made from elastic material, the base-side stem aperture 128, as defined by the base 122, is elastic. Likewise, the base-side stem collar 164 is elastic. Accordingly, to inhibit sealant from escaping therethrough around occupant stems, the base-side stem aperture 128 and the base-side stem collar 164 may be slightly undersized to the defined amount of stems, and configured to allow the defined amount of stems therethrough with an elastic stretch fit.

Furthermore, in the instant implementation, the sealant receptacle 104 includes a cover-side sealant barrier 166 and a base-side sealant barrier 168 housed in the core sleeve 160. Proximally along the core sleeve 160, the cover-side sealant barrier 166 extends across the core sleeve 160 behind the cover 120. Terminally along the core sleeve 160, in spaced opposition with the cover-side sealant barrier 166, the base-side sealant barrier 168 extends across the core sleeve 160 ahead of the base 122. The cover-side sealant barrier 166 and the base-side sealant barrier 168 are configured to prevent sealant from penetrating therethrough. Likewise, extending across the core sleeve 160 behind the cover 120 and ahead of the base 122, the cover-side sealant barrier 166 and the base-side sealant barrier 168 are configured to sandwich sealant in the sealant receptacle 104 in isolation from the cover 120 and the base 122. At the same time, the cover-side sealant barrier 166 and the base-side sealant barrier 168 are stem-puncturable. As noted above, according to the method for making the horticultural arrangement 130, stems are inserted successively through the cover-side stem apertures 126 and the base-side stem aperture 128. In conjunction with the insertion of stems through the cover-side stem apertures 126, the cover-side sealant barrier 166, extending behind the cover 120, is configured to define cover-side stem punctures therethrough leading from the cover-side stem apertures 126. Similarly, in conjunction with the insertion of stems through the base-side stem aperture 128, the base-side sealant barrier 168, extending ahead of the base 122, is configured to define base-side stem punctures therethrough leading to the base-side stem aperture 128. Accordingly, the cover-side sealant barrier 166 and the base-side sealant barrier 168 may be made from semi-impermeable and stem-puncturable material, such as floral foam.

Because floral foam, although permeable to liquid, is not only impermeable to semi-liquid, but also stem-puncturable, its employment as the cover-side sealant barrier 166 and the base-side sealant barrier 168 promotes the retentive holding of sealant in the sealant receptacle 104 all around occupant stems from the top and from the bottom. In particular, when defined, the cover-side stem punctures, leading from the cover-side stem apertures 126, allow stems therethrough as similarly-sized extensions of the cover-side stem apertures 126. Accordingly, the cover-side stem punctures are configured to contributorily inhibit sealant from escaping through the cover-side stem apertures 126 around occupant stems. Similarly, when defined, the base-side stem punctures, leading to the base-side stem aperture 128, allow stems therethrough as a similarly-sized extension of the base-side stem aperture 128. Accordingly, the base-side stem punctures are configured to contributorily inhibit sealant from escaping through the base-side stem aperture 128 around occupant stems.

As shown, in addition to the vase 102 and the sealant receptacle 104, the plant transportation system 100 includes a tabbed annular retainer 170 for the sealant receptacle 104 housed in the throat 116. As noted above, the sealant receptacle 104 is recessed in the throat 116 behind the mouth 110. With the sealant receptacle 104 recessed in the throat 116 behind the mouth 110, the retainer 170 is housed in the throat 116 in the recess between the mouth 110 and the sealant receptacle 104. From in the recess between the mouth 110 and the sealant receptacle 104, the retainer 170 is removably secured between the mouth 110 and the sealant receptacle 104. In particular, the retainer 170 is removably snapped between the mouth 110 and the sealant receptacle 104. With the sealant receptacle 104 supported in the throat 116, the retainer 170, removably secured between the mouth 110 and the sealant receptacle 104, retains the sealant receptacle 104 in the throat 116.

As noted above, the core sleeve 160 serves as the structural core of the sealant receptacle 104. According to the integrated multi-piece construction of the sealant receptacle 104, the cover-side sealant barrier 166 and the base-side sealant barrier 168 are housed in the core sleeve 160, and the jacket 162 is fitted around the core sleeve 160.

As shown with particular reference to FIG. 5B, the cover-side sealant barrier 166 and the base-side sealant barrier 168 are housed in the core sleeve 160 as unitary blocks of floral foam. As a unitary block of floral foam, the base-side sealant barrier 168 is inserted into the core sleeve 160. Inserted into the core sleeve 160, the base-side sealant barrier 168 is supported in the core sleeve 160 terminally along the core sleeve 160. Similarly, as a unitary block of floral foam, the cover-side sealant barrier 166 is inserted into the core sleeve 160 ahead of the base-side sealant barrier 168. Inserted into the core sleeve 160, the cover-side sealant barrier 166 is supported in the core sleeve 160 proximally along the core sleeve 160. As shown, following the frustum-shaped configuration of the sealant receptacle 104, the core sleeve 160 is frustum-shaped. Likewise, similarly to the core sleeve 160, the cover-side sealant barrier 166 and the base-side sealant barrier 168 are frustum-shaped. In particular, the core sleeve 160 is frustoconical. Likewise, the cover-side sealant barrier 166 and the base-side sealant barrier 168 are frustoconical. Accordingly, the cover-side sealant barrier 166 and the base-side sealant barrier 168 are supported by the core sleeve 160 by frustum-in-frustum interfacing.

As shown with particular reference to FIG. 5C, with the cover-side sealant barrier 166 and the base-side sealant barrier 168 housed in the core sleeve 160, the jacket 162 is fitted around the core sleeve 160 through the base-side stem aperture 128 and the base-side stem collar 164. As noted above, with the jacket 162 made from elastic material, the base-side stem aperture 128 and the base-side stem collar 164 are elastic. Accordingly, although significantly undersized to the core sleeve 160, the base-side stem collar 164 and the base-side stem aperture 128 are configured to allow the core sleeve 160 therethrough under elastic stretching, leaving the core sleeve 160 inside the jacket 162. With the core sleeve 160 inside the jacket 162, the base-side stem collar 164 and the base-side stem aperture 128 are configured to close around the core sleeve 160 under elastic contraction, leaving the jacket 162 fitted around the core sleeve 160.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A plant transportation system, comprising:
a vase, the vase including a mouth, a throat, and a reservoir; and
a sealant receptacle housed in the throat, the sealant receptacle configured to allow a defined amount of stems therethrough, and including a cover extending across the throat, a base extending across the throat behind the cover, and a sidewall extending behind the cover to the base, the cover defining at least one cover-side stem aperture, the at least one cover-side stem aperture similarly sized to the defined amount of stems, and elastic and configured to allow the defined amount of stems therethrough with an elastic stretch fit, the base defining at least one base-side stem aperture, the at least one base-side stem aperture similarly sized to the defined amount of stems, and elastic and configured to allow the defined amount of stems therethrough with an elastic stretch fit, and the sidewall closing the sealant receptacle from a side, wherein the sealant receptacle includes a cover-side sealant barrier extending perpendicular to the sidewall behind the cover, and a base-side sealant barrier extending perpendicular to the sidewall a head of the base, the cover-side sealant barrier made from stem-puncturable material, and the base-side sealant barrier made from stem-puncturable material.

2. The plant transportation system of claim 1, wherein the defined amount of stems is a predetermined number of rose stems, and the predetermined number of rose stems is between ten and eighteen inclusive.

3. The plant transportation system of claim 1, wherein the sealant receptacle is housed in the throat as a unitary module, and removable from the throat through the mouth as a unitary module.

4. The plant transportation system of claim 1, wherein the throat is frustum-shaped, the sealant receptacle is frustum-shaped, and the sealant receptacle is supported by the throat by frustum-in-frustum interfacing.

5. The plant transportation system of claim 1, wherein the throat narrows toward the junction between the throat and the reservoir.

6. The plant transportation system of claim 1, further comprising:
a retainer housed in the throat, the retainer removably secured between the mouth and the sealant receptacle, thereby retaining the sealant receptacle in the throat.

7. The plant transportation system of claim 1, further comprising:
liquid in the reservoir;
sealant filling the sealant receptacle between the cover-side sealant barrier and the base-side sealant barrier, the sealant being pre-hydrated super absorbent polymer (SAP) powder; and
the defined amount of stems inserted through the sealant receptacle successively through the at least one cover-side stem aperture, cover-side stem punctures defined by the cover-side sealant barrier and leading from the at least one cover-side stem aperture, base-side stem punctures defined by the base-side sealant barrier and leading to the at least one base-side stem aperture, and the at least one base-side stem aperture, leaving occupant stems inside the sealant receptacle, the at least one cover-side stem aperture inhibiting and the cover-side stem punctures contributorily inhibiting the sealant from escaping through the at least one cover-side stem aperture around the occupant stems, and the at least one cover-side stem aperture inhibiting and the cover-side stem punctures contributorily inhibiting the sealant from escaping through the at least one base-side stem aperture around the occupant stems.

8. A plant transportation system, comprising:
a vase, the vase including a mouth, a throat, and a reservoir; and
a sealant receptacle housed in the throat, the sealant receptacle configured to allow a defined amount of stems therethrough, and including a cover extending across the throat, a base extending across the throat behind the cover, and a sidewall extending behind the cover to the base, the cover defining multiple cover-side stem apertures each similarly sized to a share of the defined amount of stems, the base defining a common base-side stem aperture similarly sized to the defined amount of stems, and the sidewall closing the sealant receptacle from a side, wherein the sealant receptacle includes a cover-side sealant barrier extending perpendicular to the sidewall behind the cover, and a base-side sealant barrier extending perpendicular to the sidewall ahead of the base, the cover-side sealant barrier made from stem-puncturable material, and the base-side sealant barrier made from stem-puncturable material.

9. The plant transportation system of claim 8, wherein the defined amount of stems is a predetermined number of rose stems, the cover defines the same predetermined number of cover-side stem apertures, and a share of the defined amount of stems is one rose stem.

10. The plant transportation system of claim 9, wherein the predetermined number of rose stems is between ten and eighteen inclusive.

11. The plant transportation system of claim 8, wherein the cover-side stem apertures are each elastic and configured to allow a share of the defined amount of stems therethrough with an elastic stretch fit, and the base-side stem aperture is elastic and configured to allow the defined amount of stems therethrough with an elastic stretch fit.

12. The plant transportation system of claim 8, further comprising:
liquid in the reservoir;

sealant filling the sealant receptacle between the cover-side sealant barrier and the base-side sealant barrier, the sealant being pre-hydrated super absorbent polymer (SAP) powder; and the defined amount of stems inserted through the sealant receptacle successively through the cover-side stem apertures, cover-side stem punctures defined by the cover-side sealant barrier and leading from the cover-side stem apertures, base-side stem punctures defined by the base-side sealant barrier and leading to the base-side stem aperture, and the base-side stem aperture, leaving occupant stems inside the sealant receptacle, the cover-side stem apertures inhibiting and the cover-side stem punctures contributorily inhibiting the sealant from escaping through the cover-side stem apertures around the occupant stems, and the cover-side stem aperture inhibiting and the cover-side stem punctures contributorily inhibiting the sealant from escaping through the base-side stem aperture around the occupant stems.

13. A plant transportation system, comprising:

a vase, the vase including a mouth, a throat, and a reservoir; and a sealant receptacle housed in the throat, the sealant receptacle configured to allow a defined amount of stems therethrough, and including a core sleeve, and a jacket fitted around the core sleeve, the jacket extending proximally over the core sleeve to form a cover extending across the throat, and extending terminally over the core sleeve to form a base extending across the throat behind the cover, and the core sleeve forming a sidewall extending behind the cover to the base, the cover defining at least one cover-side stem aperture, the at least one cover-side stem aperture similarly sized to the defined amount of stems, the base defining at least one base-side stem aperture, the at least one base-side stem aperture similarly sized to the defined amount of stems, and the sidewall closing the sealant receptacle from a side.

14. The plant transportation system of claim 13, wherein the defined amount of stems is a predetermined number of rose stems, and the predetermined number of rose stems is between ten and eighteen inclusive.

15. The plant transportation system of claim 13, wherein the at least one cover-side stem aperture is elastic and configured to allow the defined amount of stems therethrough with an elastic stretch fit, and the at least one base-side stem aperture is elastic and configured to allow the defined amount of stems therethrough with an elastic stretch fit.

16. The plant transportation system of claim 13, wherein the at least one base-side stem aperture is a common base-side stem aperture similarly sized to the defined amount of stems, the base includes a base-side stem collar leading from the base-side stem aperture, and the base-side stem aperture and the base-side stem collar are elastic and configured to allow the defined amount of stems therethrough with an elastic stretch fit.

17. The plant transportation system of claim 13, further comprising:

liquid in the reservoir;

sealant filling the sealant receptacle between the cover and the base, the sealant being pre-hydrated super absorbent polymer (SAP) powder; and the defined amount of stems inserted through the sealant receptacle successively through the at least one cover-side stem aperture and the at least one base-side stem aperture, leaving occupant stems inside the sealant receptacle, the at least one cover-side stem aperture inhibiting the sealant from escaping therethrough around the occupant stems, and the at least one base-side stem aperture inhibiting the sealant from escaping therethrough around the occupant stems.

18. The plant transportation system of claim 1, wherein the cover-side sealant barrier is made from floral foam, and the base-side sealant barrier is made from floral foam.

19. The plant transportation system of claim 8, wherein the cover-side sealant barrier is made from floral foam, and the base-side sealant barrier is made from floral foam.

* * * * *